(12) United States Patent
Fujiwara et al.

(10) Patent No.: US 7,778,753 B2
(45) Date of Patent: Aug. 17, 2010

(54) VEHICLE OPERATION ASSISTING SYSTEM

(75) Inventors: Yukihiro Fujiwara, Saitama (JP); Mitsuharu Kanaboshi, Saitama (JP); Yasushi Shoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1416 days.

(21) Appl. No.: 11/120,312

(22) Filed: May 2, 2005

(65) Prior Publication Data
US 2005/0267660 A1    Dec. 1, 2005

(30) Foreign Application Priority Data
May 14, 2004 (JP) .............................. 2004-145305

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |

(52) U.S. Cl. .......................... 701/41; 701/48; 701/70; 701/71; 701/78; 701/83; 701/300; 701/301; 701/302; 340/435; 340/436; 340/438; 340/903; 342/61; 342/72; 342/70; 342/71; 342/175; 345/958; 367/909

(58) Field of Classification Search ................ 701/301, 701/302, 41, 48, 70, 71, 78, 83, 300; 340/435, 340/436, 438, 903; 342/70, 71, 72, 118, 342/175; 345/958; 367/909
See application file for complete search history.

(56) References Cited

U.S. PATENT DOCUMENTS

| | | | | | |
|---|---|---|---|---|---|
| 4,165,511 | A | * | 8/1979 | Wocher et al. | ................. 342/70 |
| 5,416,713 | A | * | 5/1995 | Kameda et al. | ............. 701/301 |
| 5,467,284 | A | * | 11/1995 | Yoshioka et al. | ............ 701/301 |
| 5,473,538 | A | * | 12/1995 | Fujita et al. | .................... 701/45 |
| 5,625,447 | A | * | 4/1997 | Kikuchi et al. | ............. 356/4.01 |

(Continued)

FOREIGN PATENT DOCUMENTS

JP          07-021500         1/1995

(Continued)

*Primary Examiner*—Khoi Tran
*Assistant Examiner*—Jorge O Peche
(74) *Attorney, Agent, or Firm*—Carrier Blackman & Associates P.C.; William D. Blackman; Joseph P. Carrier

(57) ABSTRACT

A vehicle operation assist system includes as assist yaw rate calculator which calculates a necessary moving amount to avoid an obstacle based on a detection result of the obstacle by a radar device, and a vehicle movement controller controls lateral movement of the vehicle based on the calculated moving amount. When an avoiding operation detector determines initiation of an obstacle avoiding operation by the driver, the vehicle movement controller operates a braking device to control the lateral movement of the vehicle, so that the obstacle can be reliably avoided. When a restoring operation detector determines initiation of a restoring operation, the vehicle movement controller operates a power steering device to control the lateral movement of the vehicle, so that delay in the steering operation by the driver, and excessive restoring operation of the steering handle to compensate for the delay are suppressed, thus stabilizing vehicle behavior.

5 Claims, 6 Drawing Sheets

U.S. PATENT DOCUMENTS

| | | | |
|---|---|---|---|
| 5,714,928 A * | 2/1998 | Sudo et al. | 340/436 |
| 5,854,987 A * | 12/1998 | Sekine et al. | 701/41 |
| 5,878,361 A * | 3/1999 | Sekine et al. | 701/41 |
| 5,995,037 A * | 11/1999 | Matsuda et al. | 342/71 |
| 6,017,101 A * | 1/2000 | Matsuda | 303/140 |
| 6,017,102 A * | 1/2000 | Aga | 303/191 |
| 6,021,375 A * | 2/2000 | Urai et al. | 701/301 |
| 6,084,508 A * | 7/2000 | Mai et al. | 340/463 |
| 6,157,892 A * | 12/2000 | Hada et al. | 701/301 |
| 6,203,120 B1 * | 3/2001 | Urai et al. | 303/125 |
| 6,259,992 B1 * | 7/2001 | Urai et al. | 701/301 |
| 6,294,987 B1 * | 9/2001 | Matsuda et al. | 340/436 |
| 6,487,500 B2 * | 11/2002 | Lemelson et al. | 701/301 |
| 6,574,559 B2 * | 6/2003 | Shinmura et al. | 701/301 |
| 6,675,096 B2 * | 1/2004 | Matsuura | 701/301 |
| 6,820,007 B2 * | 11/2004 | Abe et al. | 701/301 |
| 6,825,756 B2 * | 11/2004 | Bai et al. | 340/435 |
| 6,889,786 B2 * | 5/2005 | Watanabe et al. | 180/167 |
| 7,099,764 B2 * | 8/2006 | Seto et al. | 701/70 |
| 7,607,741 B2 * | 10/2009 | Seto et al. | 303/193 |
| 2001/0003810 A1 * | 6/2001 | Shinmura et al. | 701/301 |
| 2002/0022927 A1 * | 2/2002 | Lemelson et al. | 701/301 |
| 2002/0156581 A1 * | 10/2002 | Matsuura | 701/301 |
| 2003/0067219 A1 * | 4/2003 | Seto et al. | 303/193 |
| 2003/0106732 A1 * | 6/2003 | Watanabe et al. | 180/169 |
| 2004/0155811 A1 * | 8/2004 | Albero et al. | 342/70 |
| 2009/0228174 A1 * | 9/2009 | Takagi et al. | 701/41 |

FOREIGN PATENT DOCUMENTS

| | | |
|---|---|---|
| JP | 09-301210 | 11/1997 |
| JP | 10-138894 | 5/1998 |
| JP | 2001-001925 | 1/2001 |
| JP | 2002-316634 | 10/2002 |

* cited by examiner

019# VEHICLE OPERATION ASSISTING SYSTEM

RELATED APPLICATION DATA

Japanese priority application No. 2004-145305, upon which the present application is based, is hereby incorporated in its entirety herein by reference.

BACKGROUND OF THE INVENTION

1. Field of the Invention

The present invention relates to a vehicle operation assisting system for assisting an avoiding operation of a vehicle avoiding an obstacle and a restoring operation following the avoiding operation.

2. Description of the Related Art

Japanese Patent Application Laid-open No. 7-21500 discloses an automatic brake control system which determines the possibility of the subject vehicle on which the system is installed colliding with an obstacle based on a distance between the vehicle and the obstacle and a relative speed detected by the radar device; and automatically actuates a brake device of the vehicle when the possibility of collision is confirmed. In this system, when it is determined that collision with the obstacle cannot be avoided by only the braking force by the brake device and a steering operation of the driver which is detected, the turning property of the vehicle is enhanced by individually controlling braking forces of the left and right wheels and generating a yaw moment, thereby avoiding collision.

Also, Japanese Patent Application Laid-open No. 10-138894 discloses an automatic braking control system for avoiding collision by performing automatic braking when a radar device detects an obstacle ahead of the subject vehicle. In this system, when the driver performs a steering operation to avoid collision, a steering avoiding ability indicative of an ability of avoiding the obstacle, is calculated based on the steering operation amount, and the magnitude of the braking force of automatic braking is controlled in accordance with the steering avoiding ability, thereby effectively securing the ability of avoiding an obstacle by the steering operation.

As a general tendency of the case where a driver seeks to avoid collision with an obstacle found ahead of the driver's vehicle by a steering operation, operation amount of a steering handle in the first half of the steering operation (avoiding operation) becomes insufficient or excessive so that an appropriate avoidance of the obstacle is impossible; and restoring of the steering handle is delayed in the second half of the steering operation (restoring operation) so that the driver performs an excessive restoring operation of the steering handle in order to compensate for the delay, resulting in a possibility that a side slip of the vehicle occurs, which leads to spin.

SUMMARY OF THE INVENTION

The present invention has been achieved in view of the above-mentioned described circumstances, and has an object of providing a vehicle operation assisting system capable of properly assisting both an obstacle avoiding operation and a restoring operation by a driver.

In order to achieve the object, according to a first feature of the present invention, there is provided a vehicle operation assisting system which assists an obstacle avoiding operation of a vehicle and a restoring operation following the avoiding operation, comprising: obstacle detecting means for detecting an obstacle ahead of a subject vehicle; avoiding operation determining means for determining initiation of the obstacle avoiding operation by a driver; restoring operation determining means for determining initiation of the restoring operation after avoiding the obstacle; avoiding moving amount calculating means for calculating a necessary moving amount to avoid the obstacle based on an output of the obstacle detecting means; and vehicle movement control means for controlling lateral movement of the vehicle based on the moving amount calculated by the avoiding moving amount calculating means, wherein until the restoring operation determining means determines the initiation of the restoring operation after the avoiding operation determining means determines the initiation of the avoiding operation, the vehicle movement control means operates at least a braking device to control lateral movement of the vehicle; and after the restoring operation determining means determines the initiation of the restoring operation, the vehicle movement control means operates at least a power steering device to control the lateral movement of the vehicle.

In addition to the first feature, according to a second feature of the present invention, the restoring operation determining means compares an offset amount of a center of the obstacle with respect to a center line of the subject vehicle, and a target lateral moving distance calculated from a lateral width of the obstacle and a lateral width of the subject vehicle; and determines the start of the restoring operation when the offset amount exceeds the target lateral moving distance.

In addition to the first feature, according to a third feature of the present invention, the restoring operation determining means determines the start of the restoring operation when the obstacle detecting means loses sense of the obstacle.

An electronic control negative pressure booster 2 and a hydraulic control device 4 in the embodiment correspond to the braking device of the present invention, assist yaw rate calculating means M8 of the embodiment corresponds to the avoiding moving amount calculating means of the present invention, and a first radar device Sa of the embodiment corresponds to the obstacle detecting means of the present invention.

With the first feature, the avoiding moving amount calculating means calculates the necessary moving amount to avoid the obstacle based on the obstacle detection result of the obstacle detecting means, and when the avoiding operation determining means determines the start of the obstacle avoiding operation by the driver, the vehicle movement control means controls lateral movement of the vehicle based on the moving amount calculated by the avoiding moving amount calculating means. While the avoiding operation determining means determines the start of the obstacle avoiding operation by the driver and the avoiding operation is carried out, the vehicle movement control means operates at least the braking device to control the lateral movement of the vehicle. Therefore, the obstacle can be reliably avoided by compensating for the delay, excess and insufficiency in the steering operation by the driver, with the yaw moment generated by the braking force. Also, while the restoring operation determining means determines start of the restoring operation and the restoring operation is performed, the vehicle movement control means operates at least the power steering device to control the lateral movement of the vehicle, so that delay in the steering operation of the driver, and excessive returning operation of the steering handle to recover the delay are suppressed, thus stabilizing the vehicle behavior.

With the second feature, in comparison between the offset amount of the center of the obstacle with respect to the center line of the subject vehicle, and the target lateral moving distance calculated from the lateral width of the obstacle and the lateral width of the subject vehicle, when the offset amount exceeds the target lateral moving distance, the start of the restoring operation is determined. Therefore, the operation is shifted to the restoring operation, after confirming that the possibility of collision of the subject vehicle with the obstacle is completely eliminated.

With the third feature, the start of the restoring operation is determined when the obstacle detecting means loses sense of the obstacle, and therefore the operation is shifted to the restoring operation after confirming that the possibility of collision of the subject vehicle with the obstacle is completely eliminated.

The above-mentioned object, other objects, characteristics, and advantages of the present invention will become apparent from an explanation of a present embodiment, which will be described in detail below by reference to the attached drawings.

DESCRIPTION OF THE PRESENT EMBODIMENT

Figure 1:
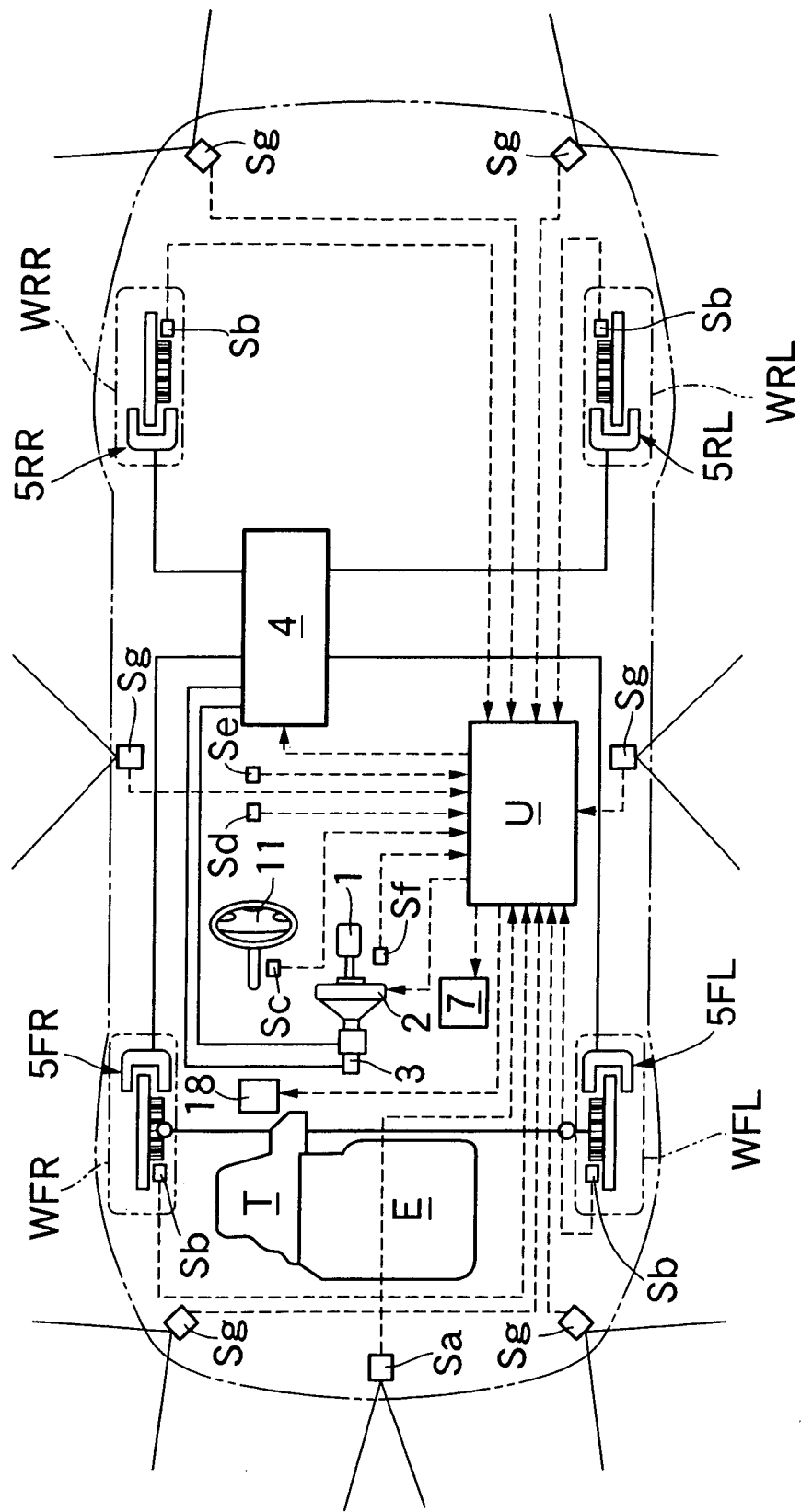
FIG. 1 is a view showing an entire construction of an automobile mounting an operation assisting system according to an embodiment of the present invention.
Figure 2:
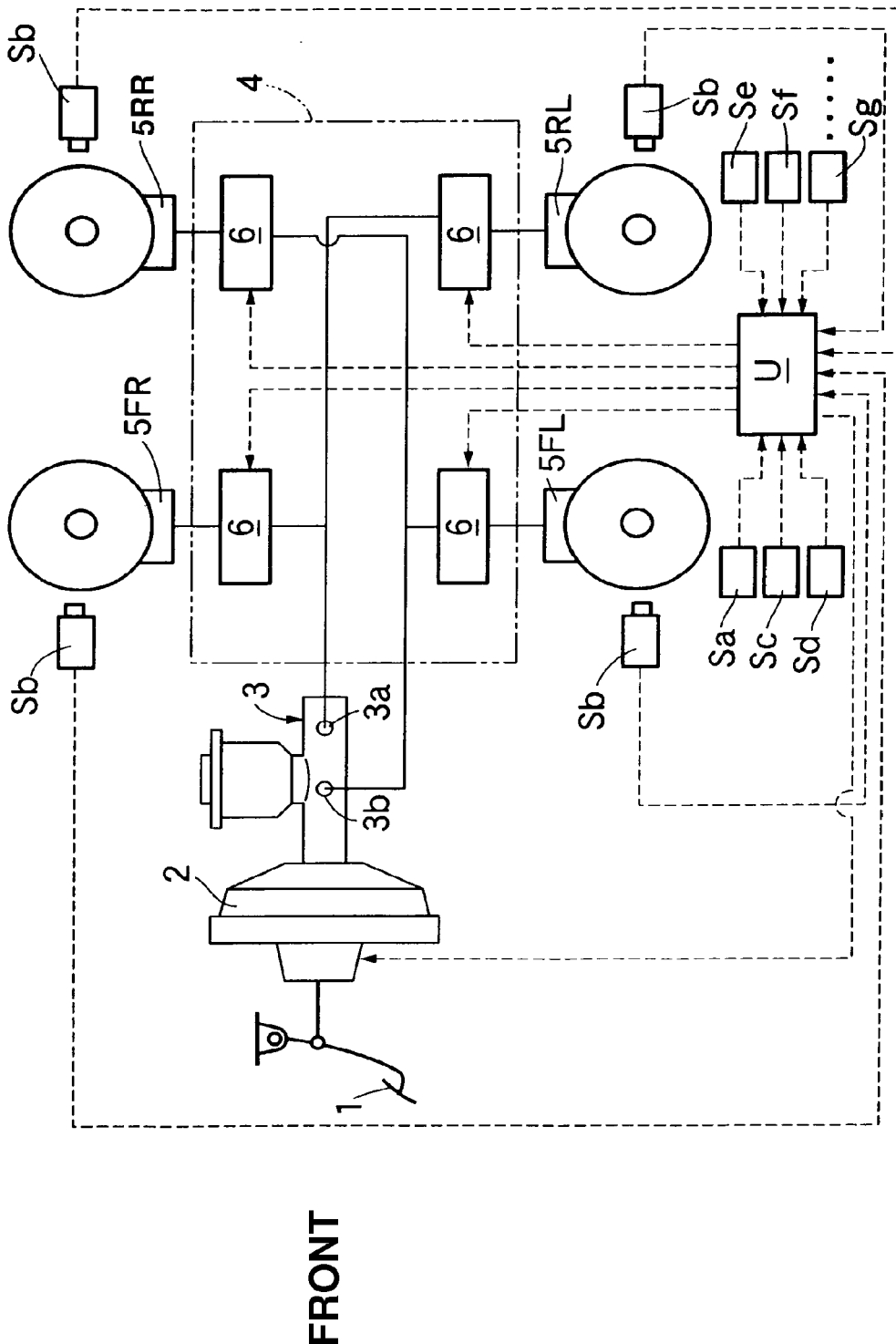
FIG. 2 is a block diagram showing a construction of a braking device.

As shown in FIGS. 1 and 2, a four-wheel vehicle mounting an operation assisting system of this embodiment includes left and right front wheels WFL and WFR as driven wheels to which a driving force of an engine E is transmitted via a transmission T, and left and right rear wheels WRL and WRR as follower wheels rotating with traveling of the vehicle. A brake pedal 1 operated by a driver is connected to a master cylinder 3 via an electronic control negative pressure booster 2 constructing a part of the braking device of the present invention. The electronic control negative pressure booster 2 operates the master cylinder 3 by mechanically boosting the pressing force applied to the brake pedal 1, and operates the master cylinder 3 by a braking command signal from an electronic control unit U without the operation of the brake pedal 1 at the time of automatic braking. When a pressing force is inputted onto the brake pedal 1, and the braking command signal is inputted from the electronic control unit U, the electronic control negative pressure booster 2 outputs a brake hydraulic pressure corresponding to a larger one of the pressing force and the braking command signal. An input rod of the electronic control negative pressure booster 2 is connected to the brake pedal 1 via a lost motion mechanism, and even when the electronic control negative pressure booster 2 is operated by the signal from the electronic control unit U and the input rod is moved forward, the brake pedal 1 remains in the initial position.

A pair of output ports 3a and 3b of the master cylinder 3 are connected to brake calipers 5FL, 5FR, 5RL and 5RR respectively provided at the front wheels WFL and WFR and the rear wheels WRL and WRR, via a hydraulic control device 4 constituting a part of the braking device of the present invention. The hydraulic control device 4 includes four pressure regulators 6 corresponding to the four brake calipers 5FL, 5FR, 5RL and 5RR. The respective pressure regulators 6 are connected to the electronic control unit U, and individually control the operations of the brake calipers 5FL, 5FR, 5RL and 5RR provided at the front wheels WFL and WFR and the rear wheels WRL and WRR.

Accordingly, if the brake hydraulic pressure transmitted to each of the brake calipers 5FL, 5FR, 5RL and 5RR is independently controlled by the pressure regulators 6 when the vehicle turns, the yaw moment of the vehicle is controlled as desired by generating a difference in the braking forces of the left and right wheels, and the vehicle behavior at the time of turning can be stabilized. Also, if the brake hydraulic pressure which is transmitted to each of the brake calipers 5FL, 5FR, 5RL and 5RR is independently controlled at the time of braking, the antilock brake control for suppressing locking of the wheels can be performed.

Figure 3:
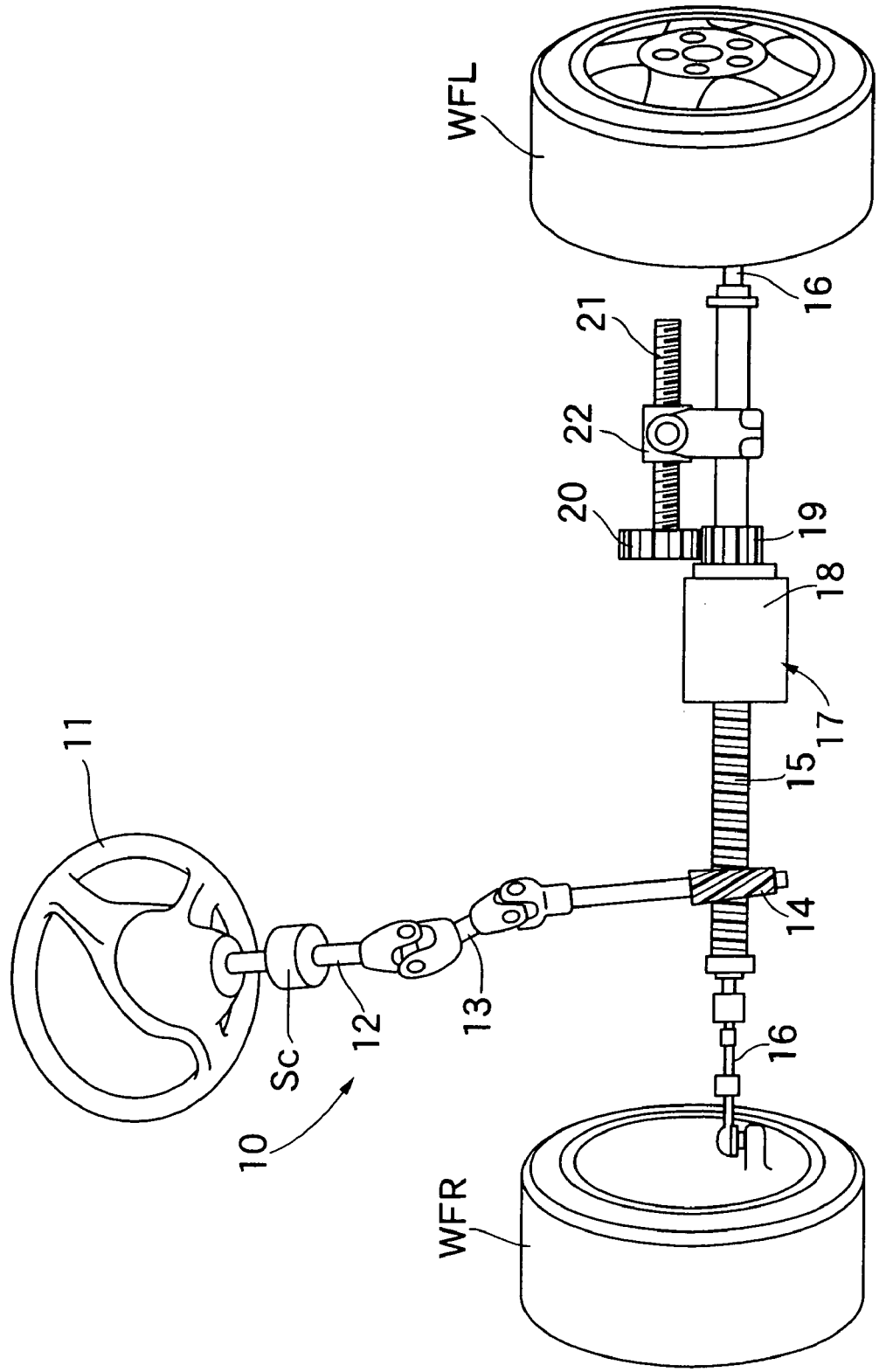
FIG. 3 is view showing a construction of a steering device.

FIG. 3 shows a structure of a steering device 10 of the vehicle. Rotation of a steering wheel or handle 11 is transmitted to a rack 15 via a steering shaft 12, a connecting shaft 13 and a pinion 14; and the reciprocating motion of the rack 15 is further transmitted to left and right front wheels WFL and WFR via left and right tie rods 16 and 16. A power steering device 17 provided at the steering device 10 includes a driven gear 19 provided at an output shaft of a steering actuator 18, a follower gear 20 meshed with this driven gear 19, a screw shaft 21 integral with the follower gear 20, and a nut 22 meshed with the screw shaft 21 and connected to the rack 15. Accordingly, if the steering actuator 18 is driven, the driving force can be transmitted to the left and right front wheels WFL and WFR via the driven gear 19, the follower gear 20, the screw shaft 21, the nut 22, the rack 15 and the left and right tie rods 16 and 16.

Connected to the electronic control unit U are: a first radar device Sa which transmits electromagnetic waves such as millimeter waves to an area ahead of the vehicle body, and detects a relative distance between an obstacle and the subject vehicle, a relative speed of the obstacle and the subject vehicle, a relative position of the obstacle and the subject vehicle and the size of the obstacle based on the reflected waves; wheel speed sensors Sb which respectively detect the rotational frequencies of the front wheels WFL and WFR and the rear wheels WRL and WRR; a steering angle sensor Sc which detects a steering angle δ of the steering wheel 11; a yaw rate sensor Sd which detects a yaw rate γ of the vehicle; a lateral acceleration sensor Se which detects a lateral acceleration YG of the vehicle; a brake operation sensor Sf which detects the operation of the brake pedal 1; and a plurality of second radar devices Sg which transmit electromagnetic waves such as laser and detects an obstacle such as a proximal vehicle around the subject vehicle based on the reflection waves.

A laser radar can be used instead of the first radar device Sa comprising a millimeter wave radar, and a television camera or the like can be used instead of the second radar devices Sg each comprising a laser radar.

The electronic control unit U controls the electronic control negative pressure booster 2, the hydraulic pressure control device 4, the steering actuator 18 and warning means 7 such as a buzzer, a lamp, a chime and a speaker, based on the signals from the first radar device Sa and the second radar devices Sg and the signal from each of the sensors Sb to Sf.

Figure 5:
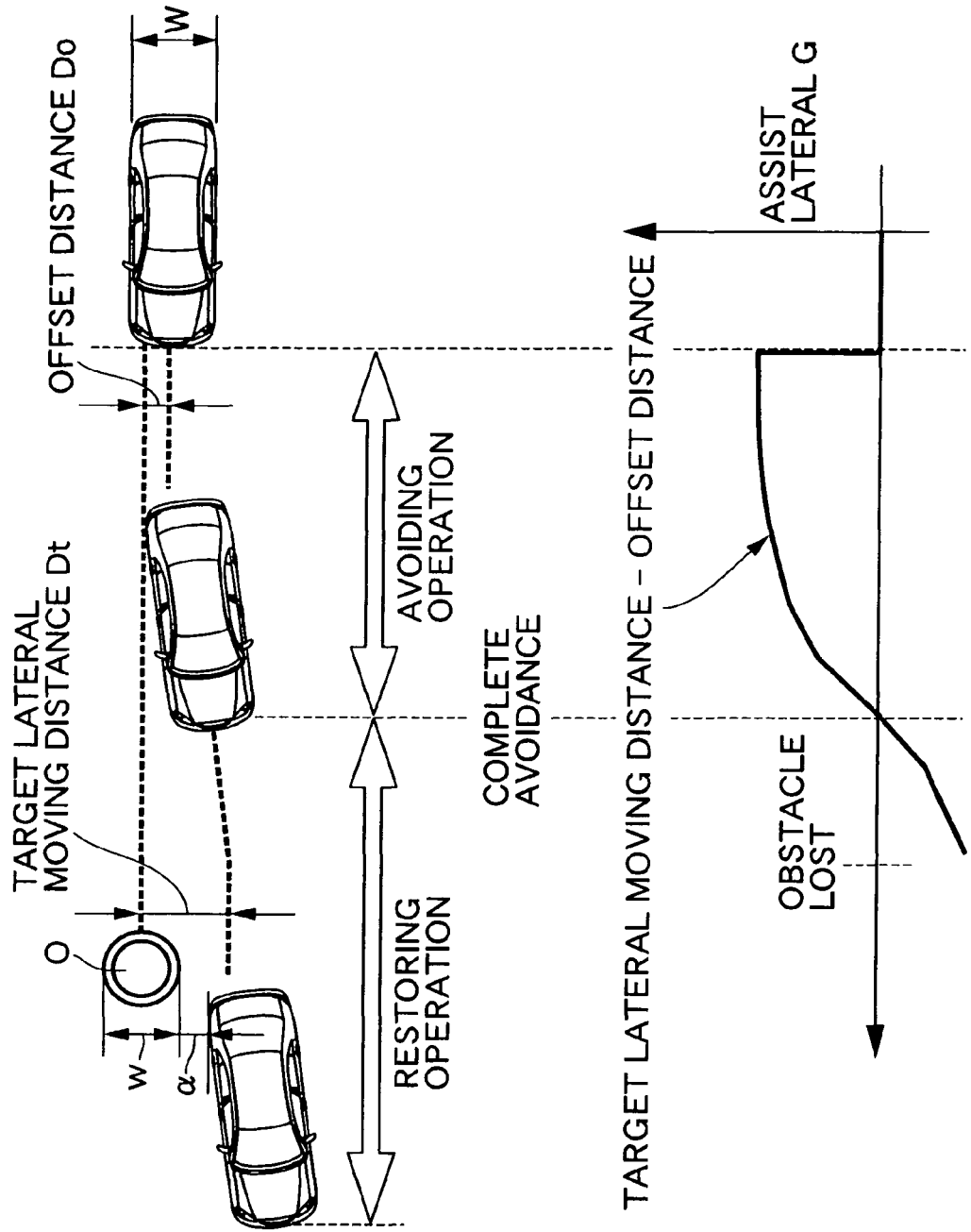
FIG. 5 is a graph showing relationship between an offset distance and a target lateral moving distance and assist lateral acceleration.

As shown in FIG. 5, in addition to the relative speed and the relative distance between the obstacle O and the subject vehicle, the first radar device Sa also detects a lateral width w of an obstacle O, and a deviation of the center of the obstacle O with respect to the center line of the subject vehicle, namely, an offset distance Do.

Figure 4:
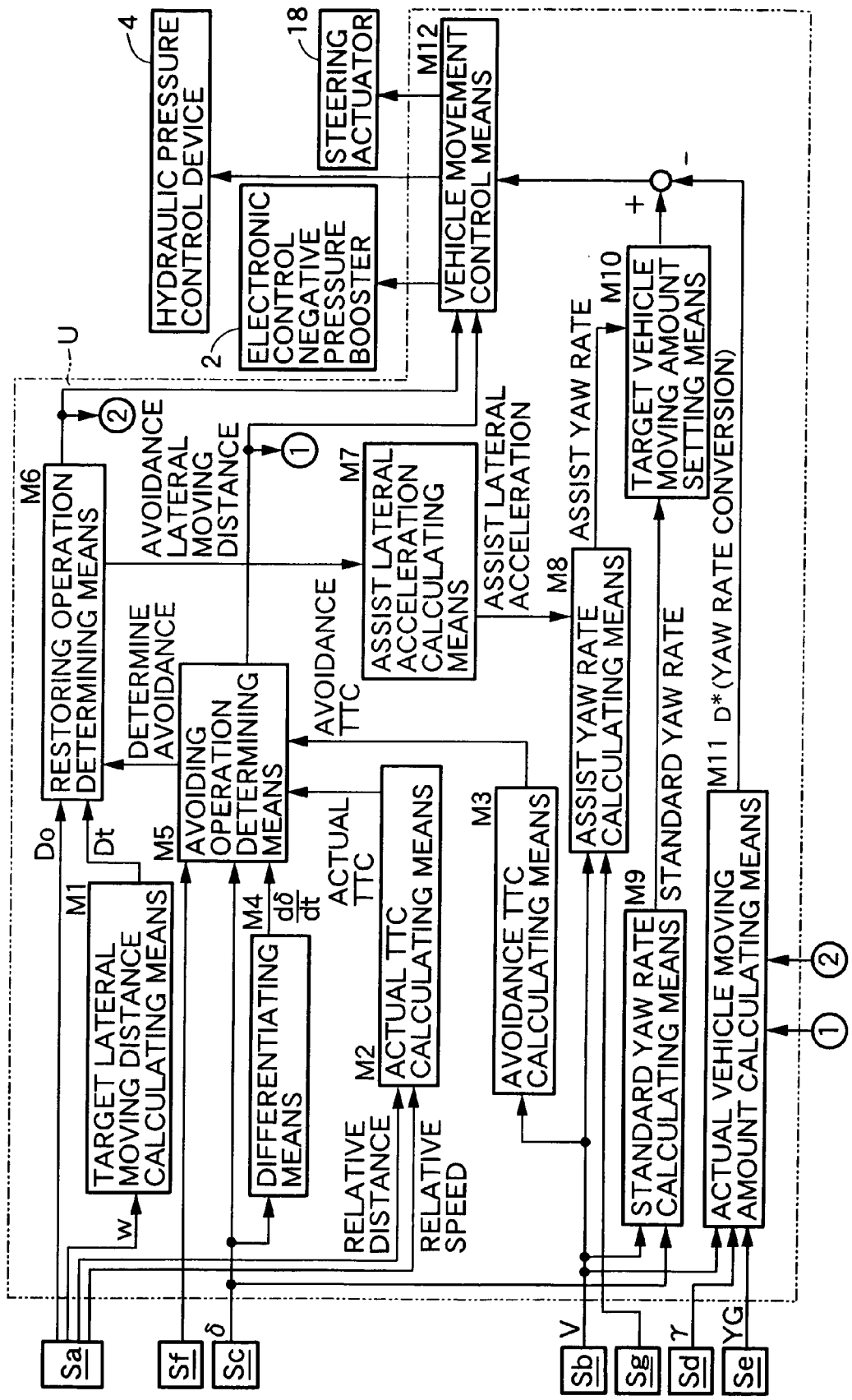
FIG. 4 is a block diagram of a control system of the operation assisting system.

As shown in FIG. 4, the electronic control unit U includes: target lateral moving distance calculating means M1; actual TTC calculating means M2 (TTC: time to collision); avoidance TTC calculating means M3; differentiating means M4; avoiding operation determining means M5; restoring operation determining means M6; assist lateral acceleration calculating means M7; assist yaw rate calculating means M8; standard yaw rate calculating means M9; target vehicle moving amount setting means M10; actual vehicle moving amount calculating means M11; and vehicle movement control means M12.

Next, an operation of the embodiment of the present invention including the above described construction will be described with reference mainly to FIG. 4.

First in FIG. 5, when the obstacle O exists ahead of the subject vehicle, collision with the obstacle O is avoided by operating the steering wheel 11 in one direction, and the subject vehicle is restored to the original course by operating the steering wheel 11 in the other direction after avoiding collision with the obstacle O. The former operation is called an avoiding operation, and the latter operation is called a restoring operation. As the general tendency of a driver, the operation amount of the steering handle 11 becomes insufficient or excessive in the avoiding operation, and restoring of the steering handle 11 is delayed in the restoring operation. Therefore, the restoring amount becomes too large, providing a possibility that lateral skid occurs, which results in spin. In this embodiment, avoidance of the obstacle O is performed smoothly by assisting the avoiding operation and the restoring operation by control of the braking force and control of the power steering device 17.

For this purpose, the target lateral moving distance calculating means M1 calculates a target lateral moving distance Dt necessary for the subject vehicle to avoid the obstacle O, by using the following equation and a lateral width w of the obstacle O detected by the first radar device Sa, a known subject vehicle lateral width W and a predetermined margin α:

$$Dt=(w/2)+(W/2)+\alpha.$$

It is the most difficult to avoid collision of the subject vehicle and the obstacle O when a center of the obstacle O lies on the center line of the subject vehicle, namely, when the obstacle O lies right in front of the subject vehicle. Even in this case, if the subject vehicle moves in the lateral direction only by the target lateral moving distance Dt, the subject vehicle can pass beside the obstacle O with a clearance corresponding to the margin α (see FIG. 5) with respect to the obstacle O.

The actual TTC calculating means M2 calculates the actual TTC by dividing the relative distance from the obstacle O detected by the first radar device Sa by the relative speed, regarding the longitudinal acceleration of the subject vehicle as zero. The actual TTC corresponds to the actual time until the subject vehicle collides with the obstacle O.

The avoidance TTC calculating means M3 calculates an avoidance TTC which is a threshold value used when it is determined that the collision avoiding operation of the driver is performed in the avoiding operation determining means M5 which will be described later. The avoidance TTC is set in the predetermined range in accordance with the vehicle speed V of the subject vehicle calculated from the outputs of the wheel speed sensors Sb.

The differentiating means M4 calculates a steering angular speed dδ/dt by performing time differential for the steering angle δ of the steering wheel 11 detected by the steering angle sensor Sc.

The avoiding operation determining means M5 determines whether or not the driver performs an operation for avoiding the obstacle O based on the operation of the brake pedal 1 by the driver detected by the brake operation sensor Sf and the steering angle δ of the steering wheel 11 of the driver detected by the steering angle sensor Sc. The determination is started when the actual TTC becomes the avoidance TTC or less. The determination as to whether or not the driver has performed the obstacle avoiding operation is performed in the following two different modes.

The first mode corresponds to the case where the actual TTC is a predetermined value or more (namely, when a time allowance until collision is relatively large). In this first mode, it is determined that the driver has performed the operation for avoiding the obstacle O, when the brake operation sensor Sf detects the brake operation of the driver, the steering angle speed dδ/dt outputted by the differentiating means M4 is a predetermined value (for example, 0.6 rad/sec) or higher, and the steering angle δ outputted by the steering angle sensor Sc is a predetermined value (for example, 6 rad) or less.

The second mode corresponds to the case where the actual TTC is less than the predetermined value (namely, a time allowance until collision is relatively small). In this second mode, it is determined that the driver has performed an operation for avoiding the obstacle O, when the steering angular speed dδ/dt outputted by the differentiating means M4 is a predetermined value (for example, 0.6 rad/sec) or more, and the steering angle δ outputted by the steering angle sensor Sc is a predetermined value (for example, 6 rad) or less, without requiring detection by the brake operation sensor Sf for the brake operation by the driver.

As a general behavior of a driver, the driver operates the steering wheel 11 after pressing first the break pedal 1 when there is a time allowance before collision, but when there is no time allowance before collision, the driver often operates first the steering wheel 11 without pressing the brake pedal 1. Therefore, the determination accuracy can be enhanced by determining the obstacle avoiding operation by the driver in the two modes divided as described above of the obstacle avoiding operation.

The direction of the obstacle avoiding operation of the driver can be determined in accordance with the sign (+ or −) of the steering angle δ outputted by the steering angle sensor Sc.

The restoring operation determining means M6 determines a shift from the first half avoiding operation to the second half restoring operation. When the following first condition or the second condition is established, the restoring operation determining means M6 determines that the avoiding operation has substantially eliminated the possibility that the subject vehicle collides with the obstacle O, and shifts the operation to the restoring operation for restoring the attitude of the subject vehicle.

The first condition is the case where the distance difference Dt−Do between the target lateral moving distance Dt calculated by the target lateral moving distance calculating means M1 and the offset distance Do (deviation of the center of the obstacle O from the center line of the subject vehicle) detected by the first radar device Sa is 0 or less, namely, the case where the offset distance Do becomes larger than the target lateral moving distance Dt and there is no possibility of the subject vehicle colliding with the obstacle O. In this case, the distance difference Dt−Do which becomes a negative value is set at zero.

The second condition is the case where the actual TTC becomes less than a predetermined value, or the case where the first radar device Sa has lost sense of the obstacle O. The former is the case where the actual TTC becomes small enough, and therefore the obstacle O is assumed to be avoided; and the latter is the case where the obstacle O is deviated enough in the lateral direction from the center line of the subject vehicle, and therefore the obstacle O is assumed to be avoided. In these cases, the distance difference Dt−Do is gradually decreased to zero.

When the operation is shifted from the avoiding operation to the restoring operation, the relative distance of the subject vehicle and the obstacle O outputted by the first radar device Sa is maintained. The reason is that when there is no possibility of collision with the obstacle O, it is not necessary to further decelerate the subject vehicle.

The assist lateral acceleration calculating means M7 calculates the assist lateral acceleration by multiplying the distance difference Dt−Do between the target lateral moving distance Dt and the offset distance Do by gain, as shown in FIG. 5. This assist lateral acceleration corresponds to the lateral acceleration which the subject vehicle needs to generate in order to avoid collision with the obstacle O.

The assist yaw rate calculating means M8 calculates an assist yaw rate by converting the assist lateral acceleration into the yaw rate by dividing the assist lateral acceleration calculated in the assist lateral acceleration calculating means M7 by the vehicle speed V of the subject vehicle calculated from the output of the wheel speed sensors Sb. In order that the value of the assist yaw rate does not diverge, the vehicle speed V is replaced with 1 km/h when it is 0 km/h. In the case where the second radar devices Sg detect another vehicle around the subject vehicle (especially another vehicle on a side or in the rear), the assist yaw rate calculating means M8 corrects the value of the assist yaw rate to be smaller when the possibility of the other vehicles interfering with the subject vehicle is higher.

The standard yaw rate calculating means M9 calculates the standard yaw rate based on the steering angle δ detected by the steering angle sensor Sc and the vehicle speed V of the subject vehicle calculated from the outputs of the wheel speed sensors Sb.

The target vehicle moving amount setting means M10 normally outputs the standard yaw rate inputted from the standard yaw rate calculating means M9 as it is, but replaces the standard yaw rate with the assist yaw rate outputted by the assist yaw rate calculating means M8, until the restoring operation is finished after the avoiding operation is determined by the avoiding operation determining means M5. When the restoring operation is finished, it gradually shifts the assist yaw rate to the standard yaw rate before the replacement.

The actual vehicle moving amount calculating means S11 calculates the actual vehicle moving amount D* by weighting and adding the yaw rate γ detected by the yaw rate sensor Sd and the lateral acceleration YG detected by the lateral acceleration sensor Se. That is, since the yaw rate γ and the lateral acceleration YG differing in dimension cannot be simply added, the lateral acceleration YG detected by the lateral acceleration sensor Se is divided by the vehicle speed V to thereby convert the lateral acceleration YG into a yaw rate, which is added to the yaw rate γ detected by the yaw rate sensor Sd.

$$D^* = K1 \cdot (YG/V) + K2 \cdot \gamma$$

Here, K1 and K2 are weighted coefficients of the yaw rate γ and the lateral acceleration YG which change in accordance with the state of the vehicle.

Namely, when the avoiding operation determining means M5 determines the start of the avoiding operation for avoiding the obstacle O, the weighted coefficient K1 ($0 \leq K1 \leq 1$) of the lateral acceleration YG is set at 1, and the weighted coefficient K2 ($0 \leq K2 \leq 1$) of the yaw rate γ is set at zero. Namely, during avoiding operation of the obstacle O, the yaw rate γ is ignored and the actual vehicle moving amount D* is calculated based on the lateral acceleration YG.

When the avoiding operation is finished and the restoring operation determining means M6 determines the start of the restoring operation, the weighted coefficient K1 of the lateral acceleration YG is gradually decreased from 1 to 0, and the weighted coefficient K2 of the yaw rate γ is gradually increased from 0 to 1. Namely, during the restoring operation after avoiding the obstacle O, the actual vehicle moving amount D* is gradually changed from the one mainly based on the lateral acceleration YG to the one mainly based on the yaw rate γ.

The vehicle movement control means M12 performs feedback control of the operation of the electronic control negative pressure booster 2, the hydraulic control device 4 and the steering actuator 18 so that the deviation between the standard yaw rate outputted by the target vehicle moving amount setting means M10 and the actual vehicle moving amount D* outputted by the actual vehicle moving amount calculating means S11 converges to zero. On this occasion, until the restoring operation determining means M16 determines the restoring operation after the avoiding operation determining means M15 determines the avoiding operation, namely, during the period of the avoiding operation, the yaw moment is generated in the vehicle by operating the electronic control negative pressure booster 2 and the hydraulic control means 4 to generate a difference between the braking force of the left wheels WFL and WRL and the braking force of the right wheels WFR and WRR. After the restoring operation determining means M16 determines the restoring operation, namely, during the period of the restoring operation, yaw moment is generated in the vehicle by operating the steering actuator 18 to give a steering torque to the left and right front wheels WFL and WFR, whereby the deviation between the standard yaw rate after correction and the actual vehicle moving amount D* is converged to zero.

Figure 6:
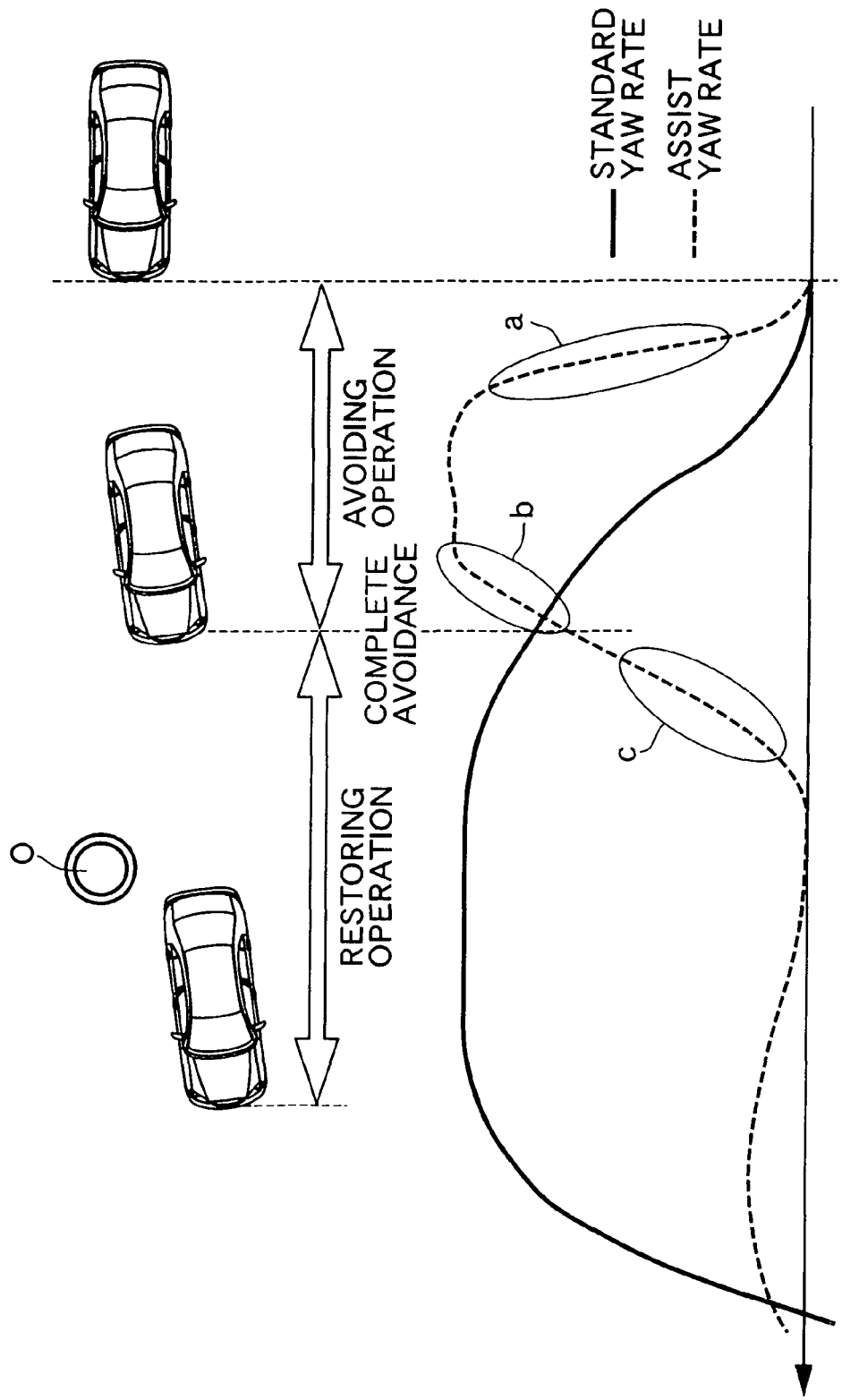
FIG. 6 is a graph showing a standard yaw rate and an assist yaw rate.

As described above, when the avoiding operation determining means M5 determines that the driver has performed the avoiding operation for avoiding collision with the obstacle O, the yaw rate corresponding to the distance difference Dt−Do between the target lateral moving distance Dt and the offset distance Do is generated by individually controlling the braking forces of the left and right wheels by operating the electronic control negative pressure booster 2 and the hydraulic pressure control means 4, and therefore the assist yaw rate can be generated to compensate the excess and deficiency of the steering operation by the driver (especially a delay and a deficiency of the steering operation), so that the obstacle O can be reliably avoided (see portion a in FIG. 6). When the avoidance of the obstacle O is ensured, the assist yaw rate is quickly decreased in accordance with the decrease in the distance difference Dt−Do, whereby the upset in the vehicle behavior can be minimized (see portion b in FIG. 6).

In the avoiding operation of the obstacle O, the assist yaw rate for avoidance is not generated by the power steering device 17, but is generated mainly by the feedback control in which the yaw rate of the vehicle is caused to agree with the standard yaw rate outputted by the target vehicle moving amount setting means M10 by individually controlling the braking forces of the left and right wheels. At this time, the yaw rate of the vehicle is the actual vehicle moving amount D* outputted by the actual vehicle moving amount calculating means M11, and the actual vehicle moving amount D* during avoiding operation substantially becomes the lateral acceleration YG of the vehicle, because the avoiding operation determining means M5 sets the weighted coefficient K1 of the lateral acceleration YG at 1, and sets the weighted coefficient K2 of the yaw rate $\gamma$ at zero. Accordingly, the feedback control is performed so that the yaw rate converted into the lateral acceleration YG of the vehicle agrees with the assist yaw rate during the avoiding operation.

When the road friction coefficient is small, if the braking forces of the left and right wheels are individually controlled so that the actual yaw rate $\gamma$ of the vehicle is caused to agree with the assist yaw rate, the actual yaw rate $\gamma$ does not occur as a yaw rate by the normal turn with the tires gripping the road, but occurs as a yaw rate due to the change in the side slip angle of the tires (yaw rate due to rotating movement of the vehicle), so that the side slip angle increases to provide a possibility that the vehicle ultimately spins.

However, in this embodiment, instead of the actual yaw rate $\gamma$, the actual vehicle moving amount D* which is substantially the lateral acceleration YG of the vehicle is used in the feedback control, whereby normal turn by which a predetermined lateral acceleration occurs is maintained by suppressing the rotating movement of the vehicle to prevent the vehicle from spinning.

When the restoring operation determining means M6 determines the start of the restoring operation processing after avoiding the obstacle O, in the actual vehicle moving amount D*, the component of the lateral acceleration YG gradually decreases and the component of the yaw rate $\gamma$ gradually increases, whereby the control can be smoothly shifted to the normal feedback control for making the actual yaw rate $\gamma$ agree with the standard yaw rate when the restoring operation is completed.

At the time of the restoring operation, the amount of restoring the steering wheel 11 by the driver tends to be so large that the vehicle behavior is upset. However, in this embodiment, the assist yaw rate is not generated by the braking force of the wheel, but is generated mainly by the control of the steering actuator 18 of the power steering device 17 in the restoring operation, so that excessive steering restoring operation of the driver in the restoring operation is suppressed to stabilize the vehicle behavior (see portion c in FIG. 6).

When the assist yaw rate calculating means M8 calculates the assist yaw rate, if the second radar devices Sg detect another vehicle on the side of the subject vehicle or behind the subject vehicle, the assist yaw rate calculating means M8 corrects the assist yaw rate to be small in accordance with the proximity degree, and therefore the subject vehicle can be prevented from contacting the other vehicle by decreasing the lateral moving amount of the subject vehicle based on the automatic avoiding movement based on the assist yaw rate.

Further, when a proximal vehicle exists around the subject vehicle, if the avoiding operation determining means M5 determines the collision avoiding operation by the driver, the warning means 7 is operated to issue a warning to the driver, and inhibits the avoiding operation by the operation assisting system. However, the restoring operation by the operation assisting system after avoiding the obstacle O is carried out as usual.

The embodiment of the present invention has been described above, but various design changes can be made without departing from the subject matter of the present invention as claimed.

What is claimed is:

1. A vehicle operation assisting system which assists an obstacle avoiding operation of a vehicle moving in an initial traveling direction, and a traveling direction-restoring operation following the avoiding operation, said system comprising:

obstacle detecting means for detecting an obstacle ahead of a subject vehicle;

avoiding operation determining means for determining initiation of the obstacle avoiding operation by a driver, based on a brake pedal signal, a steering angle signal, a speed signal, and an actual time to collision;

restoring operation determining means for determining initiation of the traveling direction-restoring operation after avoiding the obstacle, based on at least a difference between a target lateral movement distance and an offset lateral distance detected by a radar device being zero or less, and the actual time to collision being less than a predetermined value, and the radar device having lost sense of the obstacle;

avoiding moving amount calculating means for calculating a necessary lateral distance that the vehicle should be moved in order to avoid the obstacle based on an output of the obstacle detecting means, based on the lateral width of the obstacle detected by the radar device, a subject vehicle lateral width, and a predetermined margin; and vehicle movement control means for controlling lateral movement of the vehicle based on the lateral distance calculated by the avoiding moving amount calculating means, wherein said vehicle operation assisting system is configured and arranged such that during an emergency obstacle-avoidance situation, until the restoring operation determining means determines the initiation of the traveling direction-restoring operation after the avoiding operation determining means determines the initiation of the avoiding operation, the vehicle movement control means selectively operates at least a braking device so as to generate a difference in braking forces applied to left and right wheels to control lateral movement of the vehicle in order to avoid collision with the obstacle; and after the restoring operation determining means determines the initiation of the traveling direction-restoring operation, the vehicle movement control means operates at least a power steering device to control the lateral movement of the vehicle in order to resume the initial traveling direction;

wherein the restoring operation determining means compares an offset lateral distance from a center of the obstacle with respect to a center line of the subject vehicle, and a target lateral moving distance calculated from the lateral width of the obstacle and the lateral width of the subject vehicle; and determines the initiation of the restoring operation when the offset lateral distance exceeds the target lateral moving distance.

2. The vehicle operation assisting system according to claim 1, wherein the restoring operation determining means determines the initiation of the restoring operation when the obstacle detecting means loses sense of the obstacle.

3. A vehicle operation assisting system which assists an obstacle avoiding operation of a vehicle moving in an initial traveling direction, and a traveling direction-restoring operation following the avoiding operation, said system comprising:

an obstacle detector which detects an obstacle ahead of a subject vehicle;

an avoiding operation detector which determines initiation of the obstacle avoiding operation by a driver, based on a brake pedal signal, a steering angle signal, a speed signal, and an actual time to collision;

a restoring operation detector which determines initiation of the traveling direction-restoring operation after avoiding the obstacle, based on at least a difference between a target lateral movement distance and an offset lateral distance detected by a radar device being zero or less, and the actual time to collision being less than a predetermined value, and the radar device having lost sense of the obstacle;

a moving amount calculator which calculates a necessary lateral distance that the vehicle should be moved in order to avoid the obstacle based on an output of the obstacle detector based on the lateral width of the obstacle detected by the radar device, a subject vehicle lateral width, and a predetermined margin; and a vehicle movement controller which controls lateral movement of the vehicle based on the lateral distance calculated by the moving amount calculator, wherein said vehicle operation assisting system is configured and arranged such that during an emergency obstacle-avoidance situation, until the restoring operation determining detector determines the initiation of the traveling direction-restoring operation after the avoiding operation determining detector determines the initiation of the avoiding operation, the vehicle movement controller selectively operates at least a braking device so as to generate a difference in braking forces applied to left and right wheels to control lateral movement of the vehicle in order to avoid collision with the obstacle; and after the restoring operation detector determines the initiation of the restoring operation, the vehicle movement controller operates at least a power steering device to control the lateral movement of the vehicle in order to resume the initial traveling direction; and wherein the restoring operation detector compares an offset lateral distance from a center of the obstacle with respect to a center line of the subject vehicle, and a target lateral moving distance calculated from the lateral width of the obstacle and the lateral width of the subject vehicle; and determines the initiation of the restoring operation when the offset lateral distance exceeds the target lateral moving distance.

4. The vehicle operation assisting system according to claim 3, wherein the restoring operation detector determines the initiation of the restoring operation when the obstacle detector loses sense of the obstacle.

5. A method of avoiding a collision with an obstacle by a vehicle having a radar device for detecting obstacles, said method comprising the steps of:

a) sensing a first driver-initiated change in steering in a first direction when a driver begins an obstacle-avoiding operation;

b) comparing an offset lateral distance from a center of the obstacle with respect to a center line of a subject vehicle;

c) calculating a target lateral moving distance from a lateral width of the obstacle and a lateral width of the subject vehicle using a restoring operation determining means;

d) determining an initiation of a restoring operation when the offset lateral distance exceeds the target lateral moving distance, based on at least a difference between the target lateral movement distance and an offset lateral distance detected by a radar device being zero or less, and the actual time to collision being less than a predetermined value, and the radar device having lost sense of the obstacle;

e) selectively operating a braking device using an electronic controller in coordination with the first driver-initiated change in steering so as to generate a difference in braking forces applied to the left and right wheels in order to control lateral movement of the vehicle and thereby avoid collision with said obstacle;

f) passing said obstacle;

g) sensing a second driver-initiated change in steering in a second direction substantially opposite the first direction when a driver begins a vehicle travel direction-restoring operation; and h) operating a power steering device using an electronic controller in coordination with the second driver-initiated change in steering to control the lateral movement of the vehicle in order to resume the initial traveling direction.

* * * * *